United States Patent [19]
Hebden

[11] 3,711,051
[45] Jan. 16, 1973

[54] SELF LOCKING ELEMENTS

[75] Inventor: Billy Hebden, Rossendale, England

[73] Assignee: Silentnight Limited, Lancashire, England

[22] Filed: Feb. 17, 1971

[21] Appl. No.: 116,040

[52] U.S. Cl.............................248/188, 151/41.73
[51] Int. Cl..............................................F16m 11/16
[58] Field of Search..151/41.73; 287/20.92 F; 85/11; 151/14 R; 248/188; 108/156; 5/310

[56] References Cited

UNITED STATES PATENTS

| | | | |
|---|---|---|---|
| 1,410,210 | 3/1922 | Merkel et al. | 85/11 |
| 1,776,769 | 9/1930 | Baxter | 151/41.73 |
| 3,209,805 | 10/1965 | Fehrmann | 151/14 R |
| 3,476,163 | 11/1969 | Tinnerman | 151/14 R |

FOREIGN PATENTS OR APPLICATIONS

| | | | |
|---|---|---|---|
| 1,104,836 | 2/1968 | Great Britain | 151/41.73 |

*Primary Examiner*—Edward C. Allen
*Attorney*—Holman & Stern

[57] ABSTRACT

A self locking nut of U-shape with one limb longer than the other. The short limb is shaped as a barb while the long limb is provided with a screw-threaded aperture raised out of the surface of the limb by a flexible border which, in use, deforms so as to lock a bolt passed through the aperture against return movement.

3 Claims, 3 Drawing Figures

PATENTED JAN 16 1973  3,711,051

SELF LOCKING ELEMENTS

BACKGROUND OF THE INVENTION

This invention relates to self locking elements and, more particularly, to a self locking nut intended for use in the interconnection of the component parts of furniture, e.g. in the attachment of legs to the frame of such articles of furniture as beds, couches, and divans.

PRIOR TECHNIQUES

It is well known to provide the upper ends of the legs of these articles of furniture each with a screw-threaded bolt which engages in a tapped metal liner of a hole in the generally wooden frame. This has the disadvantage that the screw joint may slacken as a result of frequent shifting of the furniture, with beds being particularly prone to this fault.

It is an object of the present invention to provide a self locking nut whereby the above disadvantage can be obviated or mitigated.

SUMMARY OF THE INVENTION

According to the present invention, there is provided an article of furniture comprising a wooden frame, a plurality of supporting legs, and a plurality of self-locking nuts for attaching the legs to the frame, each leg having a body with an abutment face at its upper end in abutting relationship with the lower surface of a frame component and a threaded stud projecting from the abutment face and through the frame component, and each self-locking nut including a one-piece element of substantially U-shape with limbs of unequal length, the short limb being shaped as a barb and sunk laterally into the frame component so as to position the long limb on the upper surface of the component, and the long limb being provided at a location beyond the free end of the short limb with a stud-engaging aperture raised above the surface of the long limb by a flexible border which is resiliently downwardly deformed as the stud is screwed into the aperture to lock the stud against return movement.

An embodiment of the present invention will now be described by way of example only with reference to the accompanying drawings, in which:

DETAILED DESCRIPTION OF THE INVENTION

Figure 3:
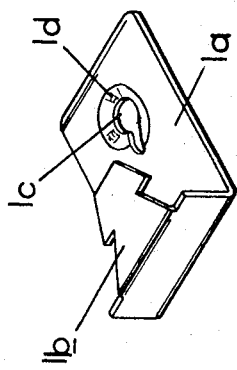
FIG. 3 is the same view of the inverted nut.
Figure 2:
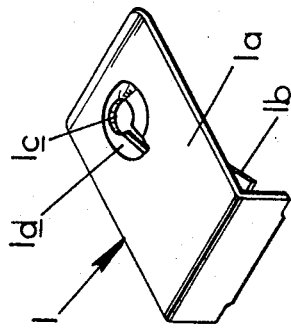
FIG. 2 is the same view of the nut alone.

Referring now to the drawings, a self-locking nut in accordance with the present invention comprises a slightly flexible metal plate 1 having a substantially oblong portion 1a and a reflex portion shaped as a barb 1b.

Figure 1:
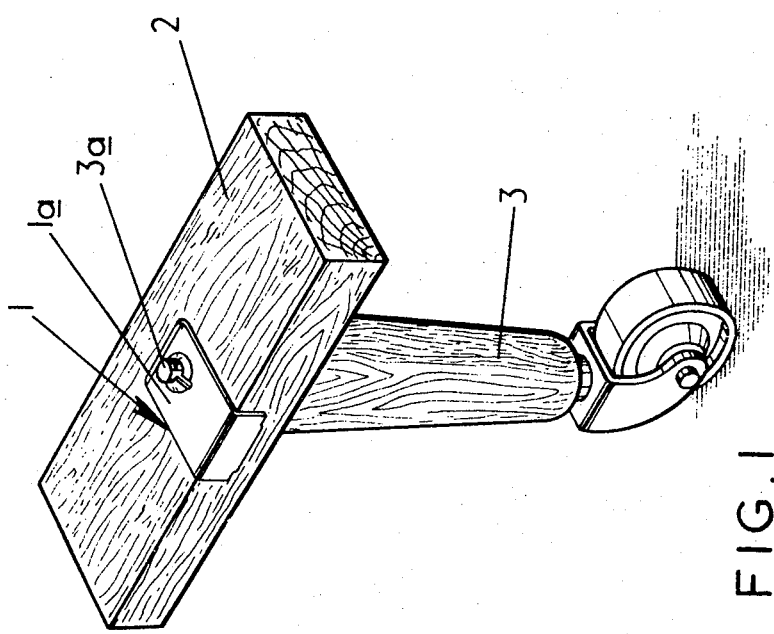
FIG. 1 is a perspective view from above of a leg of a bed interconnected with a frame element thereof by means of a self locking nut in accordance with the present invention.

As shown in FIG. 1, the barb 1b is driven into a wooden ground provided by a frame element 2 of a bed (not shown) in which position, because the plate portion 1a bends upwards slightly towards its free end, there is a slight clearance between the plate portion 1a and the upper surface of the frame element 2, with this clearance being taken up on interconnection of a leg 3 with the frame element 2 as will be described.

Adjacent its free end, the plate portion 1a is perforated and deformed to define an aperture 1c encircled for most of its perimeter by a border 1d raised from the portion 1a. In this instance, the deformation is such that the edge of the raised border 1d forms an almost complete single helix of a Whitworth form.

In use, the nut is anchored to the frame element 2 so that the aperture is in register with a hole in the frame element. A screw-threaded bolt 3a extending from the upper end of the leg 3 is inserted through this hole into engagement with the aperture 1c and is rotated to tighten the connection. Initially, the clearance between the plate portion 1a and the upper surface of the frame element 2 is taken up and then the aperture 1c is brought progressively nearer said surface by flexure of the raised border 1d. The combined effect of these two actions is to clamp the edge of the raised border 1d, i.e. the single helix aperture against the thread on the bolt 3a with a force which increases as tightening continues until, finally, it is impossible to slacken the connection either deliberately or unintentionally during shifting of the bed.

It will be appreciated that numerous modifications may be made to the embodiment described above without departing from the scope of the invention. For example, the plate portion 1a may be flat (i.e. parallel to the reflex portion) instead of being curved away from the reflex portion in the region of its free end, and in this case the locking action is due solely to flexing of the raised border 1d. Extensive tests have also been carried out using elements in which the plate portion 1a curves slightly towards the reflex portion in the region of its free end and this embodiment has also given very satisfactory results. Also, the aperture could comprise a plurality of helices which may be of Whitworth or any other suitable form corresponding to that of the screw-thread on the bolt. Alternatively, the single helix may be offset slightly to obtain an immediate friction locking with the thread of the bolt.

It is envisaged that the nut may be molded in a suitable plastic material.

The advantages of a self-locking nut in accordance with the invention are that an extremely effective connection is ensured for two reasons: firstly, the locking obtained by flexure and, secondly, that because it is formed by a reflex portion of the nut, the anchorage is secure and remains unaffected by jolting or shifting of the furniture.

What is claimed is:

1. An article of furniture comprising a wooden frame, a plurality of supporting legs, and a plurality of self-locking nuts for attaching the legs to the frame, each leg having a body with an abutment face at its upper end in abutting relationship with the lower surface of a component of the frame, and a threaded stud projecting from the abutment face and through the frame component, and each self-locking nut including a one-piece element of substantially U-shape with limbs of unequal length, the short limb being shaped as a barb and sunk laterally into the frame component to position the long limb on the upper surface of the frame component, and the long limb being provided at a location beyond the free end of the short limb with a stud-engaging aperture, said aperture being raised above the surface of the long limb by a flexible border which is resiliently downwardly deformed as the stud is screwed into the aperture to lock the stud against return movement.

2. The article of furniture as claimed in claim 1 in which the long limb of the self-locking nut, at least in the region of the stud-engaging aperture, is spaced from the upper surface of the frame component to be drawn resiliently downwardly as the stud is screwed into the aperture.

3. The article of furniture as claimed in claim 1 in which the stud-engaging aperture is defined by a single screw-thread is disconformity with the screw-thread of the stud to frictionally interfere therewith.

* * * * *